United States Patent
Fultz et al.

(10) Patent No.: US 9,256,381 B1
(45) Date of Patent: Feb. 9, 2016

(54) MANAGING DEGRADED STORAGE ELEMENTS IN DATA STORAGE SYSTEMS

(75) Inventors: Phillip P. Fultz, Clinton, MA (US);
Kiran Madnani, Santa Clara, CA (US);
Manpreet Singh, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 714 days.

(21) Appl. No.: 13/248,178

(22) Filed: Sep. 29, 2011

(51) Int. Cl.
*G06F 3/06* (2006.01)
*G06F 17/30* (2006.01)

(52) U.S. Cl.
CPC ............ *G06F 3/0649* (2013.01); *G06F 3/0611* (2013.01); *G06F 3/0689* (2013.01); *G06F 17/30221* (2013.01)

(58) Field of Classification Search
CPC ..... G06F 3/061; G06F 3/0611; G06F 3/0647; G06F 3/0649; G06F 3/0689; G06F 3/0685; G06F 17/30221
See application file for complete search history.

(56) References Cited

U.S. PATENT DOCUMENTS

| | | | | |
|---|---|---|---|---|
| 7,574,623 | B1* | 8/2009 | Goel et al. | 714/47.2 |
| 8,006,111 | B1* | 8/2011 | Faibish et al. | 711/114 |
| 2003/0069886 | A1* | 4/2003 | Jaskiewicz | 707/10 |
| 2005/0114728 | A1* | 5/2005 | Aizawa et al. | 714/6 |
| 2005/0177764 | A1* | 8/2005 | Cassell | G06F 11/0709 714/6.12 |
| 2008/0005367 | A1* | 1/2008 | Barry | H04L 41/082 710/8 |
| 2011/0066802 | A1* | 3/2011 | Kawaguchi | 711/114 |
| 2012/0047327 | A1* | 2/2012 | Ueda | 711/114 |
| 2012/0284234 | A1* | 11/2012 | Mashtizadeh et al. | 707/655 |

* cited by examiner

*Primary Examiner* — Michael Krofcheck
(74) *Attorney, Agent, or Firm* — John T. Hurley; Jason A. Reyes; Krishnendu Gupta (57) ABSTRACT

A method is used for managing degraded storage elements in data storage systems. A storage element experiencing degradation is identified where the storage element is a member of a first RAID group of storage elements. A first slice of data associated with the storage element is identified. The first slice of data is copied to a second RAID group of storage elements.

20 Claims, 9 Drawing Sheets

MANAGING DEGRADED STORAGE ELEMENTS IN DATA STORAGE SYSTEMS

BACKGROUND

1. Technical Field

This application relates to managing degraded storage elements in data storage systems.

2. Description of Related Art

A traditional storage array (herein also referred to as a "data storage system", "disk storage array", "storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to logically partition a set of disk drives into chunks of storage space, called logical units, or LUs. This enables a unified storage array to provide the storage space as a collection of separate file systems, network drives, and/or Logical Units.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost/performance profile than storing all data on a single kind of disk.

A storage tier may be made up of different types of disks, i.e., disks with different RAID (Redundant Array of Independent or Inexpensive Disks) levels, performance and cost characteristics. Several levels of RAID systems have been defined in the industry. RAID parity schemes may be utilized to provide error detection during the transfer and retrieval of data across a storage system. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact.

RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to two drives fail.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation. One issue that may be considered during allocation of a resource is the selection process—namely, how to determine which unallocated portion of the collection of resources is to be allocated to the requesting entity.

Conventionally, all resources of the same type are treated the same because it was assumed that the performance of components within the data storage array performed similarly and data would be stored and accessed evenly across the array. Initially, this assumption may be valid because any performance differences between resources of the same type and any asymmetries in data usage are unknown. However, as the data storage array fills up and the stored data is accessed, some resources may be more heavily utilized than other resources of the same type and/or resources of the same type may begin to perform differently. For example, two identical 7,200 rpm disks may initially be assumed to have identical performance and share data storage and processing loads equally because the client initially stores 10 gigabytes (GB) on each disk. However, at some later point in time, the client may either delete or rarely access the data stored on the second disk while constantly updating the files stored on the first disk. As a result, the first disk may operate with slower performance. While the client may have previously been able to observe this inefficiency, the client was unable to correct it because the client had no input or control regarding how slices were allocated or re-allocated in a logical volume created on a disk. For example, no mechanism currently exists for allocating slices for a logical volume from different performance tiers or other resource constraints specified by the client in a slice allocation request for the logical volume.

Conventional data storage systems may be configured in one or more various types of RAID configuration as described above. Depending on the particular RAID configuration, data on one storage device is typically backed-up on one or more other storage devices using conventional schemes such as parity information, data mirroring, and the like.

Figure 1:
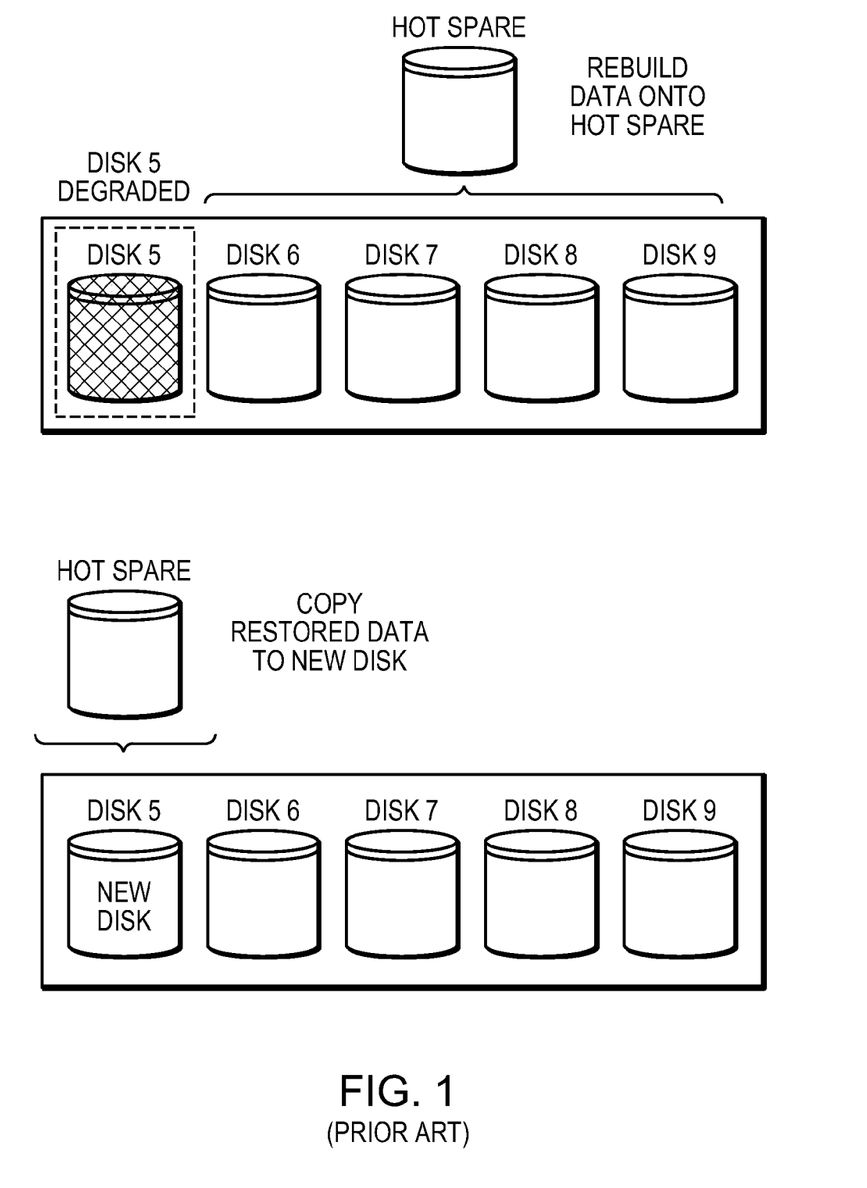
FIG. 1 is an example of a prior art rebuild method.

Storage elements, such as hard disk drives, have a typical lifetime rating after which time they will invariably fail. When a storage device in the data storage system fails, a conventional restore and repair process, such as that shown in FIG. 1, may be employed. For example, when one of a RAID's hard disk drive fails, data stored on the failed drive is reconstructed using parity information stored on the RAID's other remaining hard disk drives. In this case, data is read, in a physically linear fashion, starting at logical block address 0 and continuing to the last logical block on the drive. Data is reconstructed, and then written to a "hot spare" so configured for that particular RAID group. The hot spare is the same type of hard disk drive and has a capacity equal to that of the largest drive in the RAID group. Thus, drives are mapped on a one-to-one basis and cannot be different types (e.g., cannot migrate from SAS RAID-5 to EFD RAID-6). The failed hard disk drive is replaced, and the restored data is copied from the hot spare back onto the newly replaced, equivalent type drive. Then, the hot spare is once again made available as a hot spare for its associated RAID group.

During the rebuild time, the data storage system's performance is degraded. For example, the amount of time it takes for an application to retrieve data during the rebuild process can increase significantly, in part because they data storage system is trying to satisfy at least two tasks: rebuilding the failed drive's data and servicing application data requests (data which may also need to be reconstructed). Furthermore, some system architectures may cause data to become unavailable the moment the storage system becomes degraded (e.g., as required under certain data service level agreements).

The likelihood of irretrievable data loss is also increased during the rebuild time. For example, depending in the RAID type, should a second drive fail, parity data necessary for reconstructing data stored on the first failed drive will be lost, thereby preventing total data recovery resulting in permanent data loss.

Storage capacity of various storage elements continues to grow at an ever increasing rate. For example, 3 Terabyte hard disk drives are common place today, and larger drives have been announced or are under development. The time it takes the restoration process to complete is directly proportional to the size of the storage element, and, thus, rebuild time increased as well. Consequently, as storage capacity increases so too does the time a RAID group remains in a degraded mode as well as the amount of time data remains as risk.

SUMMARY OF THE INVENTION

A method is used for managing degraded storage elements in data storage systems. A storage element experiencing degradation is identified where the storage element is a member of a first RAID group of storage elements. A first slice of data associated with the storage element is identified. The first slice of data is copied to a second RAID group of storage elements.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing degraded storage elements in data storage systems. A degraded storage element may include, for example, a hard disk drive that is exhibiting degraded performance issues such as an outright failure or various intermittent problems indicating potential future drive failure. Degraded storage elements may also be identified using, for example, automatic and/or manual diagnostic tools and techniques, system performance reports, and the like. The drive may be a member of a group of drives configured as a particular RAID type. Data stored in the RAID group can be represented at an abstraction level in chunks or "slices" such as a 1 GB slice of data.

After a degraded storage element is identified in a particular RAID group, data stored on the degraded storage element may be reconstructed using data on the remaining operational storage units in the RAID group. Data is identified and read on a slice basis, reconstructed, and then copied to target storage. The target storage may reside in an existing, allocated RAID group with sufficient free space. The target storage may reside in another RAID group that has a higher level of performance, such as solid state drives, in effect "promoting" the data to a higher tier.

Identifying data slices to copy may include determining the temperature, or activity level, of the data slices. When copying the data slices, priority may be given to "hot" or "warm" data. In doing so, the data that is most often requested may be made available to a user sooner, thereby improving I/O performance of the data storage system. In addition, promoting data may reduce migration write time thereby further improve performance by reducing the overall rebuild time. Once data has been promoted, it may remain in the higher tier or be moved again to a lower or higher level tier according to techniques described below.

Alternatively, or in addition, multiple data slices may be read from one RAID group, reconstructed, and then written concurrently to multiple different RAID groups, effectively parallelizing the write operation over a number of different RAID groups. For example, writing the data slices to eight different RAID groups may reduce write time by a factor of eight. Further technique performance improvements may include selecting target storage that has a higher write performance, such as, for example, storage having a RAID-0, RAID-1 or RAID 10 configuration.

As used herein, a storage pool may be a collection of disks, which may include disks of different types. Storage pools may further be subdivided into slices; for example, a 1 GB slice may be the allocation element for a logical unit. As well, a pool may be used synonymously with a storage tier or a set of storage tiers. That is, both a storage tier and a pool may have storage devices of different performance capabilities and costs. As well, both may contain slices (also referred to herein as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A Logical Unit Number (LUN) is an identifier for a Logical Unit (LU). Each slice of data may have a mapping on the location of the physical drive where it starts and ends; a slice may be sliced into smaller slices.

Slices are allocated to LUNs in a storage pool as "best-fit" at initial allocation time. In at least some cases, since the I/O load pattern of a slice is not known at initial allocation time, conventionally the performance capability of allocated slice storage may be too high or too low for effective data access on a slice. However, in other cases, the initial placement of data may be user configurable. Furthermore, a data access pattern tends to change over time. Older data is accessed less frequently and therefore in at least many cases does not require storage with higher performance capability. As mentioned above, temperature of each storage slice is an indication of hotness of a slice, in other words, frequency and recency of slice I/O activity. Better overall system performance can be achieved by moving hot slices to a higher tier and cold slices to a lower tier.

Slice relocation (herein also referred to as a "data relocation" or "data migration" or "migration") is a process of determining optimal or near optimal data placement among storage objects (e.g., storage tier, RAID group) based on I/O activity of the storage objects. Slice relocation helps provide a way to determine respective preferable or best storage locations of data slices within a LUN in a storage pool, and to construct a slice relocation candidate list to move slices from their current locations to the respective preferable or best locations. Data migration, i.e., the moving of data from one storage element to another, may be performed at the LUN level or at the slice level. Data migration at the slice level may be performed by copying the data of a slice and then updating an address map of the slice with the new location of the slice.

Generally, overall system performance may be increased by managing degraded storage elements in such a way that, when rebuilding data from a failed drive, hotter data (accessed frequently) is placed on slices of a logical volume having higher performance capabilities and by placing colder data on slices of the logical volume having lower performance capabilities. Priority may also be given to hotter data such that the hotter data is migrated before colder data. Alternatively, or in addition, slices may be written concurrently or in parallel to multiple storage elements or objects.

Priority may be given to hotter data during the migration process by, for example, migrating only the warm data to a higher tier of storage. In doing so, full redundancy is restored for the more frequently accessed data faster than if the faulted RAID group were rebuilt using a hot spare drive. This is especially true for some data storage systems where the entire RAID group remains degraded until it is entirely rebuilt to a hot spare drive. In addition, a drive failure degrades performance for the entire RAID group. By prioritizing the regions that are accessed more frequently and migrating just those slices of data, performance can be returned to the user as soon as possible.

At least some implementations in accordance with current techniques as described herein may provide one or more of the following advantages: lowering storage costs by improving efficiency of the data storage system, improving I/O performance by enabling hotter data to be made available for use by a user sooner during the rebuild process, and reducing the overall rebuild time.

Figure 2:
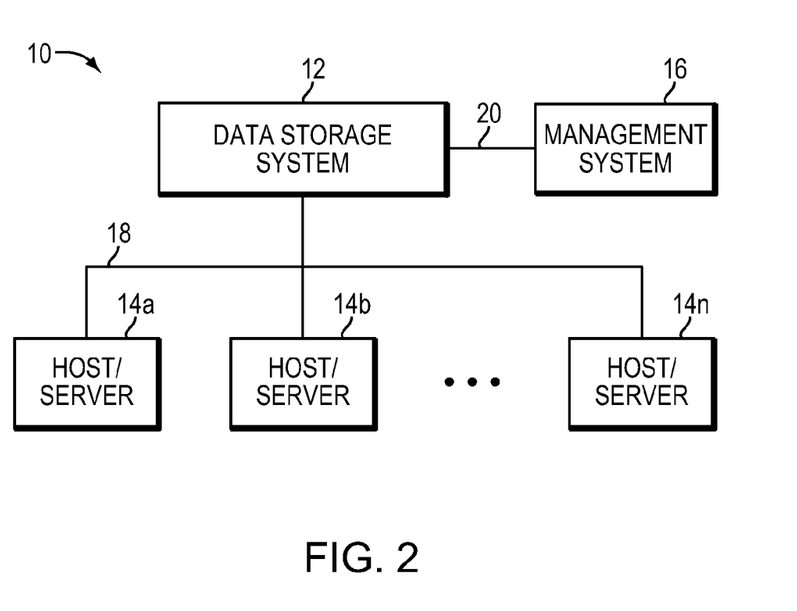
FIG. 2 is an example of an embodiment of a computer system that may utilize the techniques described herein.

Referring now to FIG. 2, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 2 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 2, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 2 is implemented using one or more data storage systems, each of the data storage systems may include code thereon for performing the techniques as described herein. In following paragraphs, reference may be made to a particular embodiment such as, for example, an embodiment in which element 12 of FIG. 2 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like. The dynamic aspects of performance characteristics may include, for example, aspects related to current I/O performance such as AST (average service time) representing the average amount of time it takes to service an event (e.g., service an I/O request), ART (average response time) based on the AST, and the average amount of time the I/O request waits. Dynamic aspects may also include, for example, utilization of different data storage system resources (e.g., particular logical or physical devices, CPU), measurement of cache hits and/or misses, and the like.

The dynamic aspects may vary with application workload, such as when particular applications may be more heavily performing I/O operations.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

An Auto-Tiering policy engine (PE) of the data storage system 12 examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list.

Figure 3:
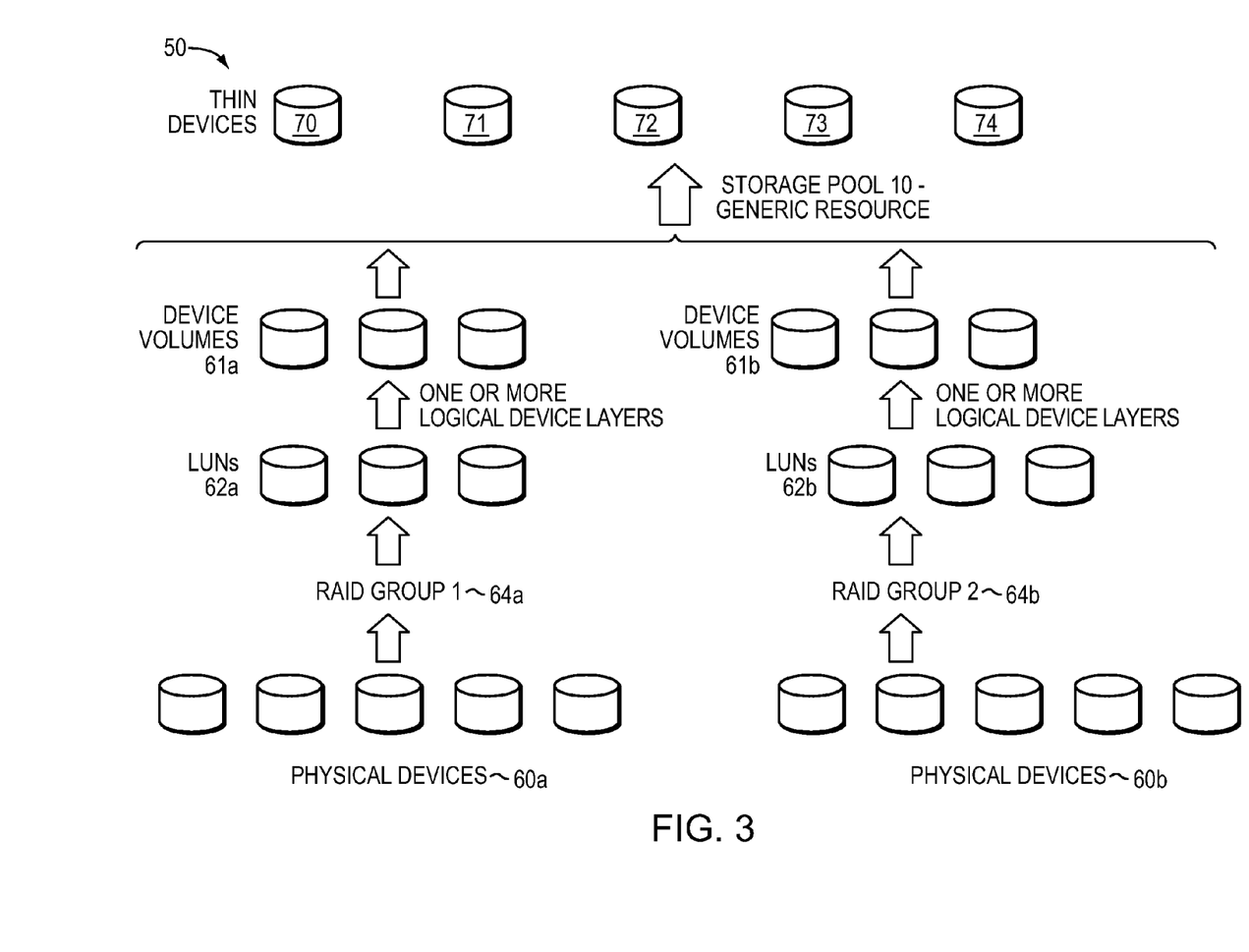
FIG. 3 is an example representation of how storage pools may be configured from physical devices in an example embodiment.

Referring to FIG. 3, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 10 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device (also referred to as "thin logical unit") presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

Figure 4:
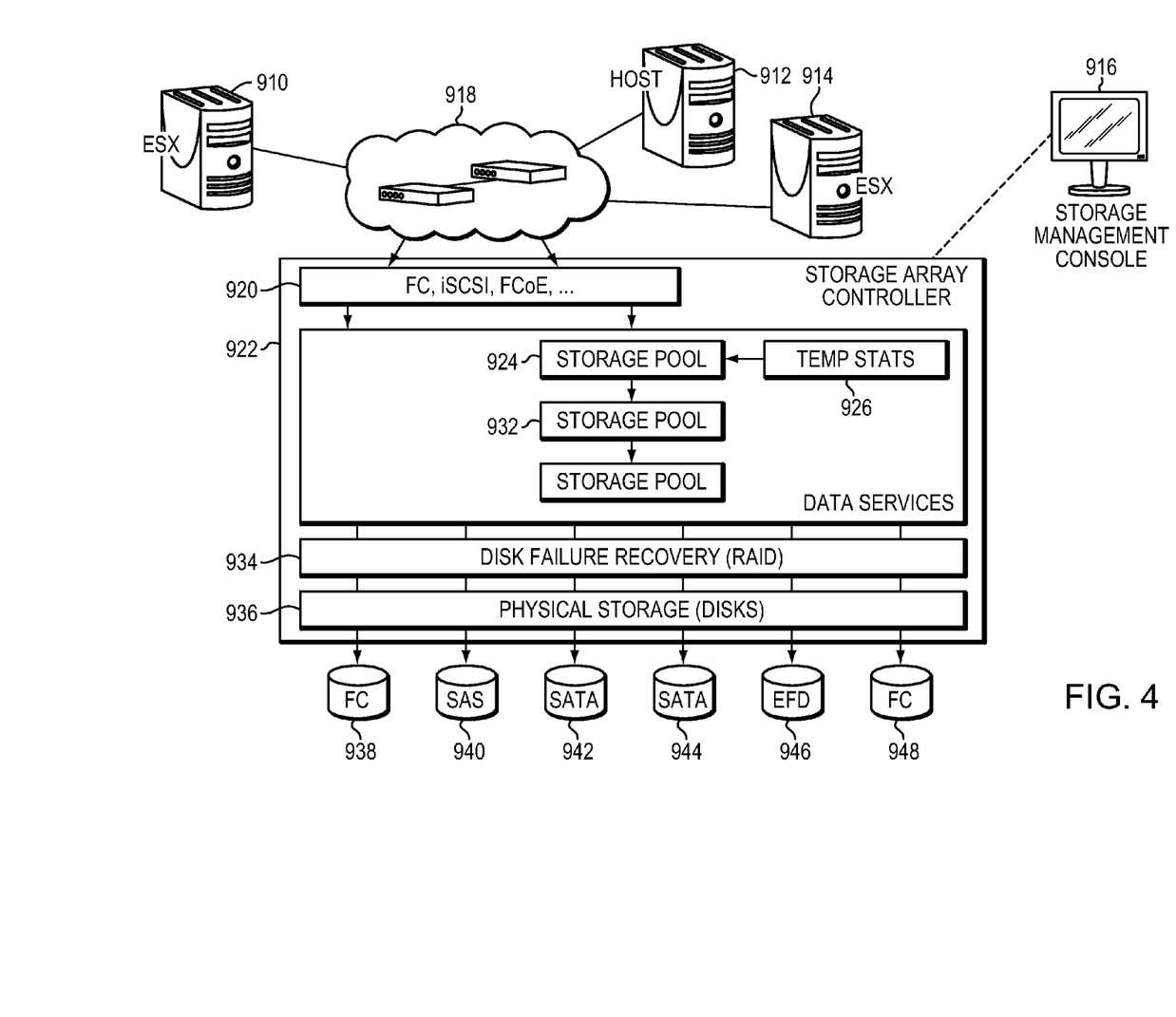
FIGS. 4 and 5 are examples of embodiments of a system that may utilize the techniques described herein.

With reference now to FIGS. 3 and 4, now described are further details and an example of a preferred embodiment of at least some aspects of the technique described herein. FIG. 4 provides an overall diagram of an enhanced data storage system and environment. The techniques described herein may be incorporated into such system in any of a variety of ways. With respect to external connections, such system may have any I/O connection (e.g., Fibre Channel (FC), Serial Attach SCSI (SAS), or iSCSI) to host systems (e.g., server 912) and/or virtual environments (e.g., ESX servers 910, 914) by way of direct connect or data communications switch fabric 918. The storage system can be managed by way of a management console 916 that allows the administrator to monitor and control operation of the storage system. The storage system connects with physical disks such as Fibre Channel 938, 948, Serial Attach SCSI 940, Serial ATA 942, 944, or Enterprise Flash Drives (EFD) 946. The storage system uses the physical disks to persistently store data for the host systems.

With respect to storage system components, the storage system has a number of internal components including a storage array controller 922. With reference now to both FIG. 4 and FIG. 5, which illustrates an MLU map 932 with other components, one component 920 handles connections (e.g., FC or iSCSI) with host systems and passes I/O 950, i.e., read or write requests, to a Mapped Logical Unit (MLU) component 924. The MLU provides the abstraction of a LUN to the host systems. As described below, the MLU makes use of the MLU map that identifies where the data is stored.

Figure 5:
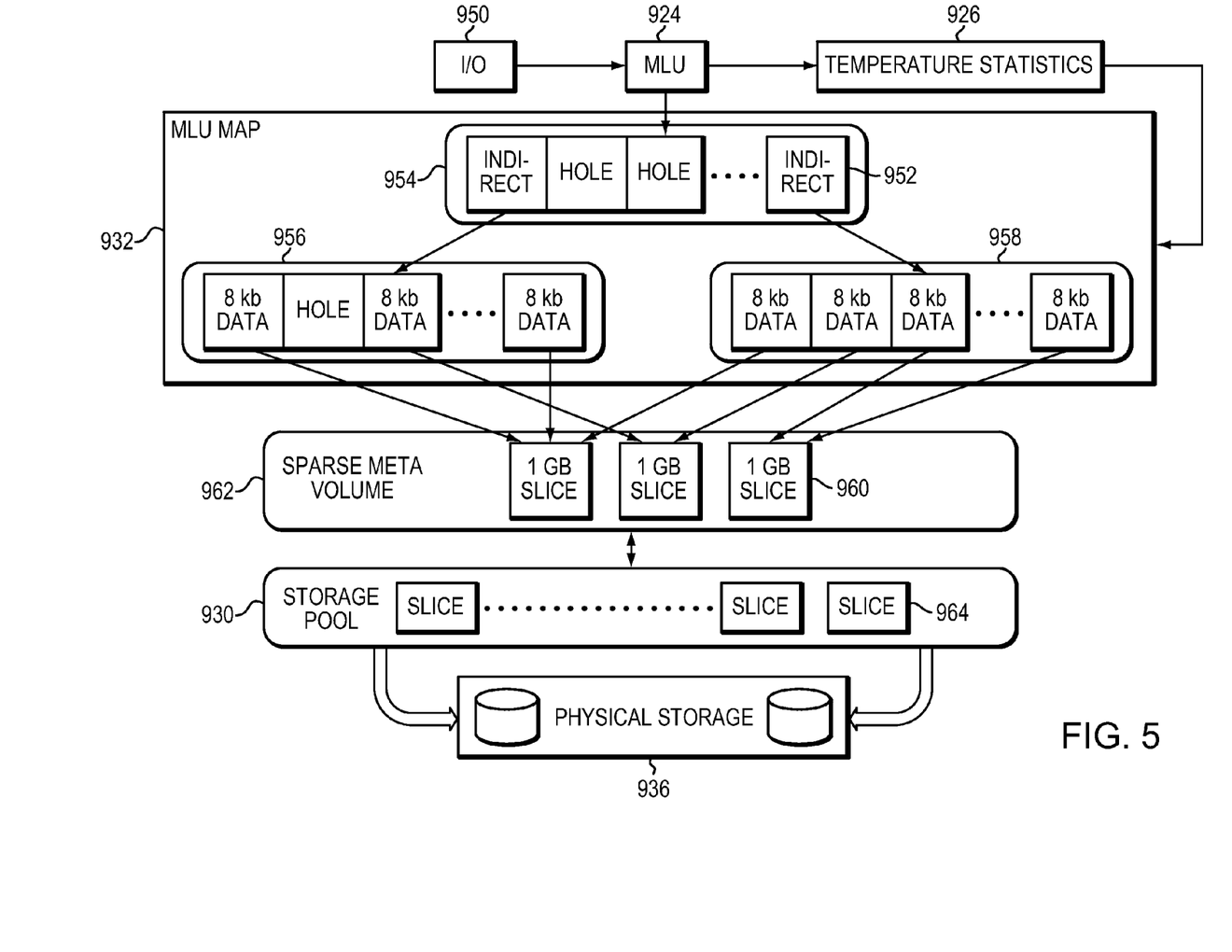

The storage system provides a mechanism 934 to help handle the failure of a physical storage 936 (e.g., disks) by using RAID algorithms to build logical abstractions of storage from physical disks. Such mechanisms provide for continued access to such logical abstractions even when a disk has failed and the system is mitigating the failure with the RAID algorithms. The logical abstraction presented by the RAID algorithms can be structured into uniform size units called slices (e.g., slice 964) with all the slices on a set of disks considered to be a storage pool (e.g., pool 930). The storage pool is thus an abstraction of RAID protected uniform size objects called slices.

The set of slices in the storage pool that are allocated for use for a particular user LUN is called a sparse meta volume (e.g., volume 962). When a MLU needs additional space, the MLU asks the storage pool to allocate another slice (e.g., slice 960) from a free slice list and the MLU then adds the slice to the sparse meta volume for the MLU.

The MLU map is a multi level hierarchal directory of pointers to data. As the size of the data increases, the number of levels increases as well. The MLU uses the MLU map to look up where data has been saved. In at least some cases, the first levels (e.g., level 954) are indirect blocks (e.g., block 952) which identify other levels of the directory (e.g., levels 956, 958). Eventually the directory entries identify the lowest level of the indirect blocks which point to the actual location for the data.

As mentioned above, the MLU and MLU map provide the abstraction of a LUN to host systems. Additional information regarding MLU abstraction can be found in U.S. patent application Ser. No. 12/751,455, entitled "MANAGING COMPRESSION IN DATA STORAGE SYSTEMS", filed Mar. 31, 2010 which application is hereby incorporated herein in its entirety.

Figure 6:
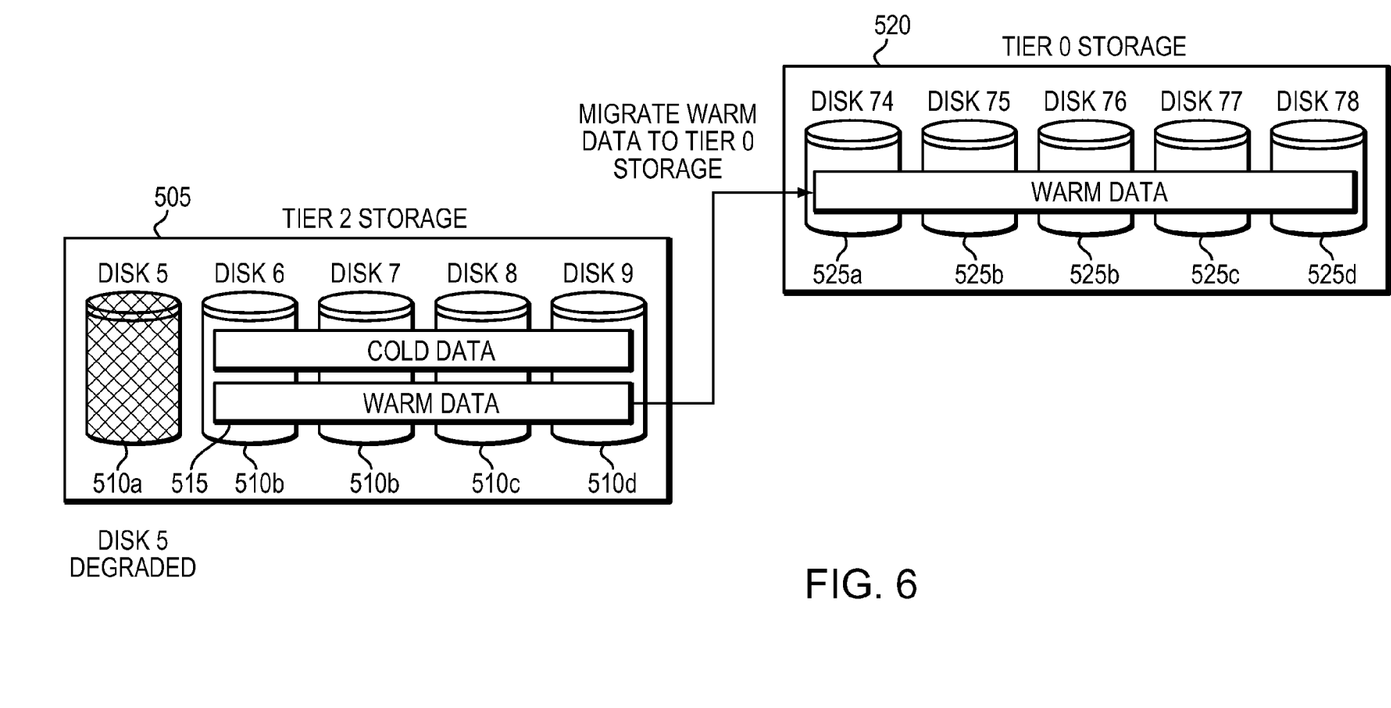
FIGS. 6 and 7 are block diagrams illustrating in more detail components that may be used in connection with techniques herein.

Referring now to FIG. 6, shown is a block diagram illustrating an example embodiment employing techniques described herein. A data storage system may include multiple groups of storage elements that are configured in a variety of RAID group types. For example, a first array 505 may contain five hard disk drives 510a-d configured as a RAID-5 type setup where the disks have parity information striped over all the disks along with the data in distributed, interleaved fashion. A second array may contain five EFD drives configured as a RAID-0 type setup. The performance characteristics of the disks 510a-d may be chosen such that they are categorized as Tier 2 storage, and may comprise SATA disk drives. Tier 2 storage may have a lower performance than other tiers, and thus, used to store warm or cold data. However, Tier 2 storage is not limited as such and may also contain hot data as well.

To facilitate efficient and/or optimal rebuild, it can be desirable to quantify the "temperature" of a given block, slice, unit, or other grouping of data. The temperature of data can be indicative of a variety of factors including, for example, the frequency and/or recency with which input or output requests relating to the data are issued or received. Data temperature can be an instantaneous measurement or can reflect a historical or long-term trend of a slice's "hotness" or "coldness," and can be used to predict the I/O access pattern of a given slice in the near future. One method of determining the temperature of a slice of data is to use an exponential moving average (EMV). In such embodiments, various metrics such as total I/O counts, block counts, and I/O response time are collected initially for each slice and then sampled periodically thereafter. A slice temperature and an EMV of slice temperatures can be calculated for each sampling period and the slice temperature value in the raw list L can be updated accordingly. The collection and calculation of slice temperature data can be performed by a user-space application running on a storage processor, a storage system management station, a host server, and/or on a client machine.

EMV-type processes can have a low computation cost, since only the current I/O activity and the latest temperature values are needed when updating temperature values for each slice. EMV processes can also incorporate a smoothing factor to reduce statistical measurement jitters in each sampling period. For example, a smoothing factor can be used to give more weight to more recent I/O activity history and less weight to older I/O activity history. The smoothing factor can be adjusted to improve the prediction accuracy of the temperature calculation by reducing jitters.

As noted above, the I/O activity of a slice of data during a given period can be useful in calculating a slice temperature. The I/O activity of a slice can be calculated in a variety of ways, including using raw slice access statistics, and the specific technique can depend on a variety of factors including, for example, the I/O traffic pattern of the system. In one embodiment, the I/O activity of a slice can be represented simply by the total I/O counts of the slice. In this case, I/O activity during a given period will simply equal the number of I/O requests received in the relevant period that address data stored in the slice. The slice temperature will be a moving average of the slice I/O access rate and will thus reflect how often data in the slice is accessed. This way of representing slice I/O activity can be desirable in applications in which the storage system is used to store large databases in which the number of input and output operations that can be processed in one second (IOPS) is the most important performance metric for a user and where a high cache hit ratio is not expected. In other applications in which there is a heterogeneous workload environment where cache hit ratio or I/O block size differs significantly, alternative representations can be more desirable.

Another way of representing the I/O activity of a slice of data during a given period is to use the normalized total response time of the slice. For many users, improving response time is one of the most important aspects of storage system performance optimization, since many users measure I/O response time as the ultimate performance indicator. In addition, response time can advantageously reflect and/or capture the compound effects of many different variables, including, for example, system load, I/O traffic pattern (random vs. sequential), I/O block size, cache hit ratio, RAID configuration, etc. Accordingly, using response time can eliminate the need to consider these factors independently. One additional factor that does need to be accounted for, however, is that I/O response times from different storage tiers can differ considerably, since tiers can have vastly different underlying performance capabilities. For example, the I/O response time of a solid state drive (also referred to as enterprise flash drive (EFD)) might be as much as 30 times faster than that of a Fibre Channel (FC) drive. Thus, it is possible that the total response time of a slice that is stored on an EFD drive or drives will be much faster than that of a slice stored on an FC drive or drives, and yet the EFD slice may service many more I/O requests than the FC slice. To yield a meaningful comparison between these response time figures, it is necessary to take into account the underlying performance capability of the storage tier or device on which the slice is stored to arrive at a normalized slice total response time.

One method of normalizing response time values for a given slice is to estimate the performance capability of the RAID group (RG) or groups to which the slice belongs. Another way of normalizing response time values for a given slice is to factor in the average response time of the RAID group in which the slice resides.

Additional information on slice temperature calculation can be found in U.S. patent application Ser. No. 12/640,254, entitled "MEASURING DATA ACCESS ACTIVITY", filed Dec. 17, 2009 which application is hereby incorporated herein in its entirety.

Once a temperature is computed for each slice, it can be used to predict future slice I/O activity and to help determine the order in which to migrate data as well as where (i.e., target array) to migrate the data to.

Returning to the example depicted in FIG. 6, Disk 5 510a has been identified as being degraded. A degraded disk may be a disk that has failed outright, experiencing intermittent performance issues, or may be targeted for replacement for various reasons (e.g., has exceeded its rated lifetime, routine maintenance, etc.). A degraded disk may also be identified using, for example, automatic and/or manual diagnostic tools and techniques, system performance reports, and the like. The rebuild process identifies a slice 515 to be migrated to another RAID group 520. Priority may be given to slices with a higher temperature as compared with other slices that will also be migrated to the target RAID group 520. Thus, hot slices may be copied to the target RAID group 520 before warm slices, warm slices may be copied before cold slices, and cold slices may be copied after warm slices.

The target RAID group 520 may be of the same, higher, or lower tier storage type. In this example, the target RAID group is a higher tier 0 storage comprising five EFD drives 525a-d. Data slices will continue to be copied in the chosen priority order until all the data from the first array 505 has been read, reconstructed, and written to the target RAID group 520.

Advantageously, once data with a higher temperature is copied to the target RAID group 520 before colder data, it meets service level agreements in that it is now backed up. Thus, this warmer data is available for use by applications sooner, resulting in improved system performance before the rebuild process has completed. In addition, if the target RAID group 520 is of a higher performing tier having faster write characteristics, the warm data will be available sooner and the entire rebuild time will be further reduced, resulting in lower time period during with the array operates in a degraded mode.

As described above, the temperature of data may be determined by analyzing how often that data is accessed, e.g., I/O access data statistics. For example, the temperature may be quantified by considering the number of times a particular slice of data is accessed in a given second or it may correspond to the response time of the accesses to the data. Some embodiments may collect data only during time periods that are of particular interest, which may be determined based on host or storage system behavior. In some embodiments, data temperature may be determined by taking the average of the calculated temperatures over a given period of time or may be calculated using exponential decay. In at least one embodiment, the temperature of a slice may be designated as a scalar or step value, that is it may have a numerical equivalent such as 30 degrees or may simply be designated into a category, such as cold or hot. The temperature may also be relative. For example, slice temperature may be determined by comparing the access statistics for a slice in a tier to access statistics of other slices in the same tier.

Figure 7:
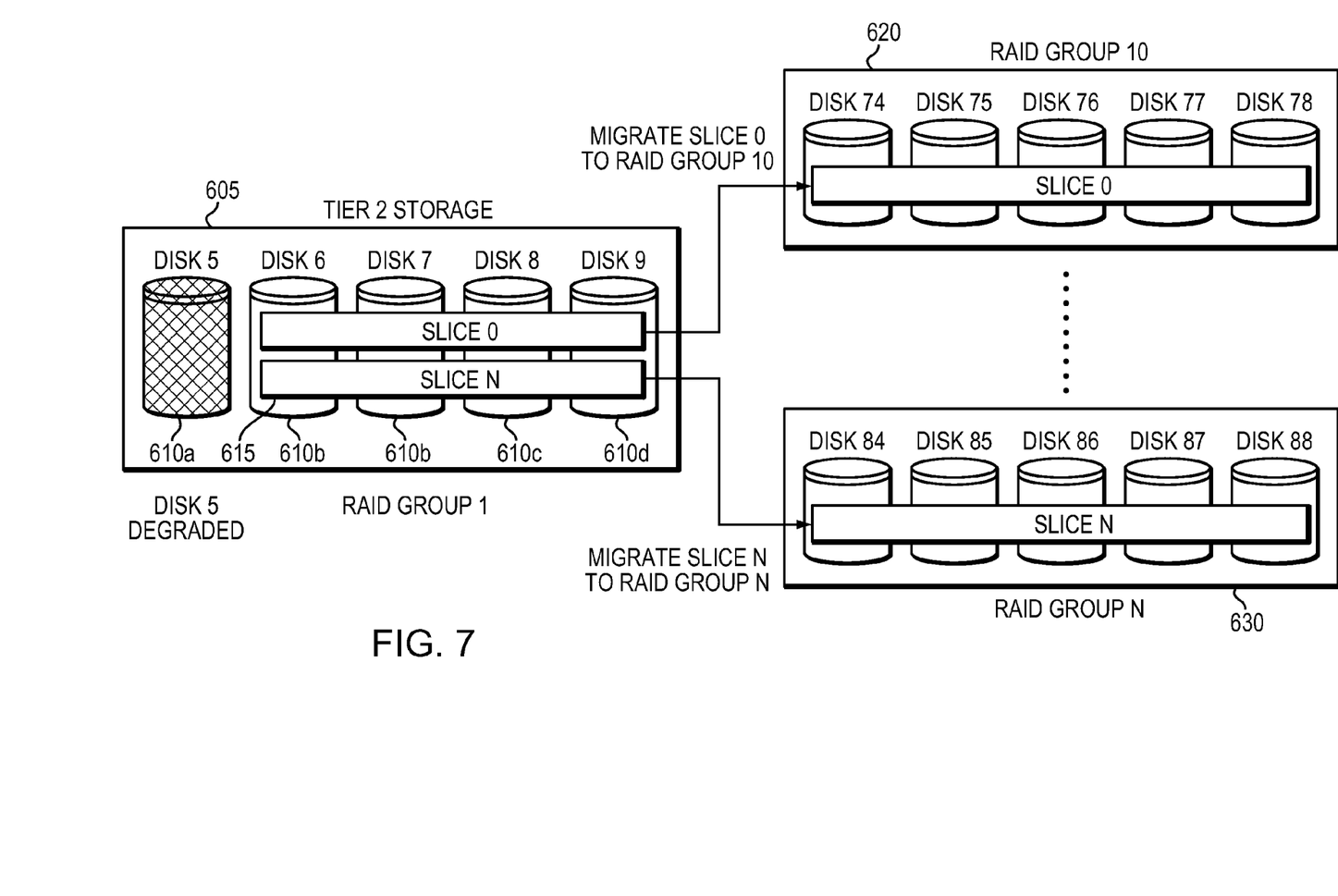

FIG. 7 illustrates an alternative example embodiment employing techniques described herein. A data storage system is depicted as comprising multiple RAID groups 605, 620, 630, which may be of the same or different RAID types and performance tiers. In this example, DISKS 610a has been identified as being degraded. As in the previous example, a degraded disk may be a disk that has failed outright, experiencing intermittent performance issues, or may be targeted for replacement for various reasons (e.g., it has exceeded its rated lifetime, it is the subject of routine maintenance). A degraded disk may also be identified using, for example, automatic and/or manual diagnostic tools and techniques, system performance reports, and the like. Meta data may be employed as described above, and each slice's temperature may be determined and used to prioritize the order in which slice data is written.

Multiple slices of data are reconstructed using, for example, parity data obtained from the remaining operating disks 610b-d. After reconstruction, multiple slices may be written concurrently to multiple other target RAID groups 620, 630. It should be noted that although only two RAID groups are depicted, data may be written to many more RAID groups concurrently. In this manner, the write portion of the rebuild time is essentially divided by the number of RAID groups used to write to. Thus, the technique effectively writes data in parallel where the parallel writes are essentially executed in the same time a single write executes.

In other words, the rates at which data can be read, reconstructed, and written are typically constrained by certain system limitations. When data is rebuilt, these constraints limit how fast data can be read and how fast data can be written. Thus, there may be read bottlenecks and write bottlenecks that limit how quick rebuild time can be achieved. Advantageously, embodiments of techniques described herein parallelize the write function, thereby dividing write operations over multiple storage elements, effectively removing the write bottleneck inherent in conventional methods.

In another alternative example embodiment, parallel writes may be employed in conjunction with utilizing meta data to determine a temperature value for one or more slices. Temperature information may then be used to prioritize the order in which successive multiple slices are written to multiple target RAID groups. In this way, multiple hot slices reconstructed from a single RAID group can be concurrently written to multiple RAID groups, thereby further improving the rebuild process.

In yet another alternative example embodiment, one or more target RAID groups may be chosen based on a RAID group's type and its associated write "friendliness," that is, how fast a particular RAID type can be written to. For example, RAID-00 types have a higher write performance as compared to RAID-6 types. Alternatively, or in addition, implementations based on techniques described herein may further improve rebuild time and performance by selectively choosing the tier level of one or more target RAID groups. For example, the write performance of a tier 0 (e.g., EFD drives) may be higher than a tier 2 (e.g., SATA drives). In this way, warm data may be effectively "promoted" to a higher tier. As such, the rebuild process can be further improved.

After rebuild is completed, the warm slice data may stay on the higher tier or may be moved back down in routine course using the temperature data in conjunction with a tiering mechanism. The I/O profile or temperature of a slice may be used by the tiering mechanism to help determine which tier the slice should be migrated to. In some embodiments, tiering mechanism may make such determinations based on user or system policies. For example, the highest tier in a data storage system may be comprised of SLC devices and the second highest tier may be comprised of MLC devices. In this example, when considering which of the two tiers to migrate a hot slice, a user or system policy may designate read-hot data (e.g., Microsoft® Exchange Server data or archived data used for business intelligence) for the second highest tier, which is comprised of MLC devices, and write-hot data for the highest tier, which is comprised of SLC devices. It should be noted that the number of reads and writes may not always be considered. For example, there may be cases in which the number of reads and writes are irrelevant. For instance, the numbers may be relevant only when a slice is to be moved onto SSD devices.

The particular user or system policies used by the tiering mechanism may take into account the characteristics of the devices that comprise a tier. For instance, in the example above with a first tier of SLC devices and a second tier of MLC devices, a policy may be used that takes into account the fact that current SLC devices are more ideal for write-heavy I/O because current MLC devices may more quickly suffer from degradation to data cell boundaries when used for write-heavy I/O as compared to SLC devices. Also, current SLC devices often provide higher write speeds than current MLC devices. A policy may also take into account the fact that current SLC devices are typically more expensive than current MLC devices. Thus, to provide for the best performance and reliability of a data storage system generally and SSDs specifically, write-hot slices may be migrated to a first tier of SLC devices and read-hot slices may be migrated to a second tier of MLC devices. In another embodiment, a tier may be comprised of both SLC and MLC devices. In this embodiment, the number of reads and writes may be considered when determining which devices (SLC or MLC) within the tier a slice should be migrated to. In other words, a tier may consist of sub-tiers—a SLC sub-tier and a MLC sub-tier. In some cases, however, a slice may be stored on a mix of SLC and MLC devices.

It should be noted that the concept described above (e.g., considering I/O profile for data when determining devices upon which the migrated data should be stored) may be applicable to circumstances other than those related to tiering. For example, in some embodiments, MLC devices may be designated for data that is read-only such as, for example, read-only replica data. As another example, the technique may be used in an embodiment to help determine a RAID scheme to be used for storing data. For example, write-intensive I/O may use a RAID-1 scheme to help, for instance, avoid read-modify-write operations, while read-intensive I/O may use a wide-striped RAID-5 scheme to provide, for example, improved read bandwidth. It should also be noted that the technique described above may be based on historical I/O data or a predicted I/O profile. For example, certain applications, e.g., such as a news portal application, may produce read-intensive data sets, and a journal file system log may produce write-intensive data sets. Thus, for these examples, a read-hot or a write-hot I/O profile may be predicted.

Additional information regarding moving slices between tiers can be found in U.S. patent application Ser. No. 12/640,292, entitled "APPLYING DATA ACCESS ACTIVITY MEASUREMENTS", filed Dec. 17, 2009 and U.S. patent application Ser. No. 13/160,784, entitled "STORING DATA", filed Jun. 15, 2011, which applications are hereby incorporated herein in their entirety.

Although the previous examples illustrate a data storage system comprising multiple RAID groups within a single data storage system, it should be noted that the RAID groups may reside in different individual data storage systems. Furthermore, the multiple RAID groups may be virtual RAID groups that may be arranged such that they reside in a cloud configuration.

FIG. 7 is a flow diagram that illustrates an example method for achieving reduced rebuild time and faster availability of more frequently accessed data similar to that shown in FIGS. 5 and 6. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin with a step S100. The method can be initiated manually by a user, for example, by entering a command in a command-line-interface or by clicking on a button or other object in a graphical user interface (GUI). The method can also be initiated automatically by storage management software and/or can be scheduled to run automatically at certain dates and times. In one embodiment, a storage system can be configured to execute the method of FIGS. 5 and 6 for a pre-determined number seconds, minutes, etc. during some off-peak period in which the storage system is typically at its lightest I/O load. Execution of the method can also be based on various user-specified constraints. For example, a user can specify one or more target RAID groups to which data will be migrated to. A user can also specify one or more tier types (i.e., level or performance) to be considered during the migration process so that one or more slices are "promoted" to a RAID group having a higher performance.

The method may further include a step S102 in which RAID groups are monitored to identify storage elements that may be operating in a degraded performance mode. Degraded storage elements may be identified automatically by, for example, a storage processor associated with a data storage system. Alternatively, a particular storage element may be targeted for replacement as part of a routine or scheduled maintenance operation. Degraded storage elements may be, for example, a disk drive that is intermittently failing or a disk drive that has failed completely.

After a storage element in a first RAID group has been determined to be in a degraded operating condition, data slices to be migrated from the RAID group are identified in step S104. The remaining operating storage elements in the RAID group associated with the degraded storage element are examined to identify slice-level data that will be migrated. In step S106, the method may further include examining slice related meta data to determine each slice's temperature which may be used to prioritize slice order migration.

In step S108, target storage is identified. Particular storage (e.g., RAID group) may be chosen as a target based on one or more factors including available space on other RAID groups, availability of unbounded storage elements, and RAID type (e.g., RAID-5, RAID-6, RAID-00, etc.). Alternatively, or in addition, RAID group's tier level may also be considered. For example, hot or warm data that was previously stored on tier 2 storage comprising SATA hard disk drives may be promoted to tier 0 storage comprising EFD drives. Thus, in contrast with conventional methods, data abstraction and tiering techniques described herein enable the target (second) RAID group to be a different type, configuration, or tier than the source RAID group.

In step S110, the identified slice data can then be copied to the targeted second RAID group of storage elements. The order in which slices are copied may be based on temperature data ascertained in step S106, or other such factors as described herein. Migration completion is determined at step D112. If complete, the method ends at Step S114. If migration has not finished (i.e., not all data has been copied), the method returns to step S104 at which point, the method continues by repeating any of steps S104, S106, S018, S110 and D112 as described above and will continue until all necessary data slices have been copied to the second target RAID group.

Figure 8:
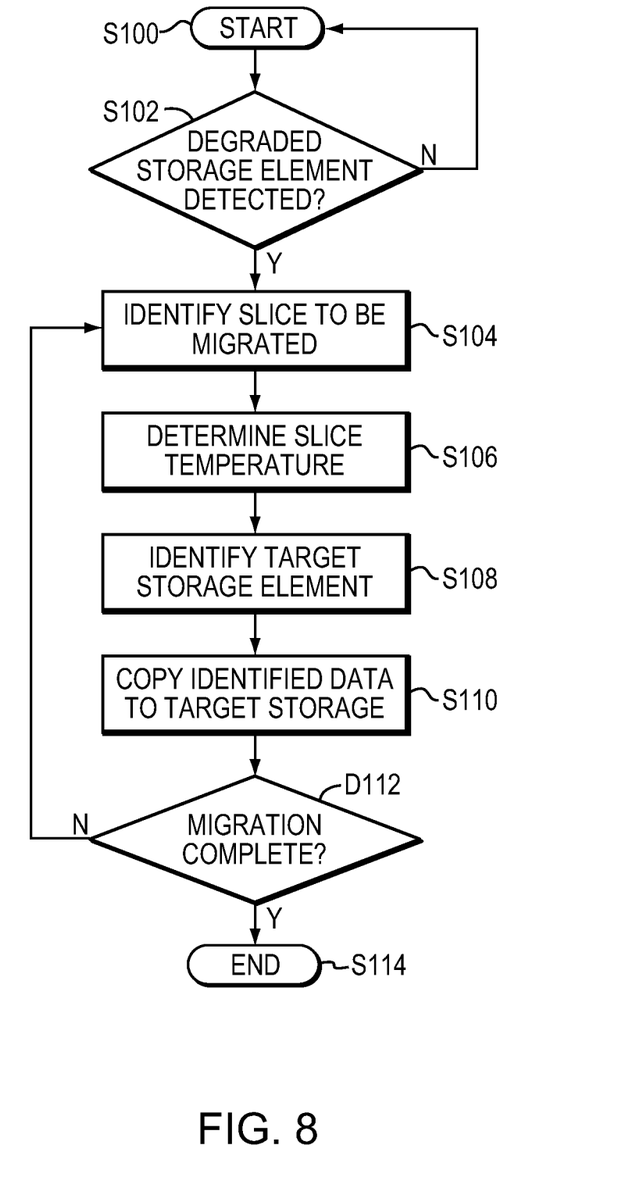
FIGS. 8 and 9 are flow diagrams illustrating processes that may be used in connection with techniques described herein.
Figure 9:
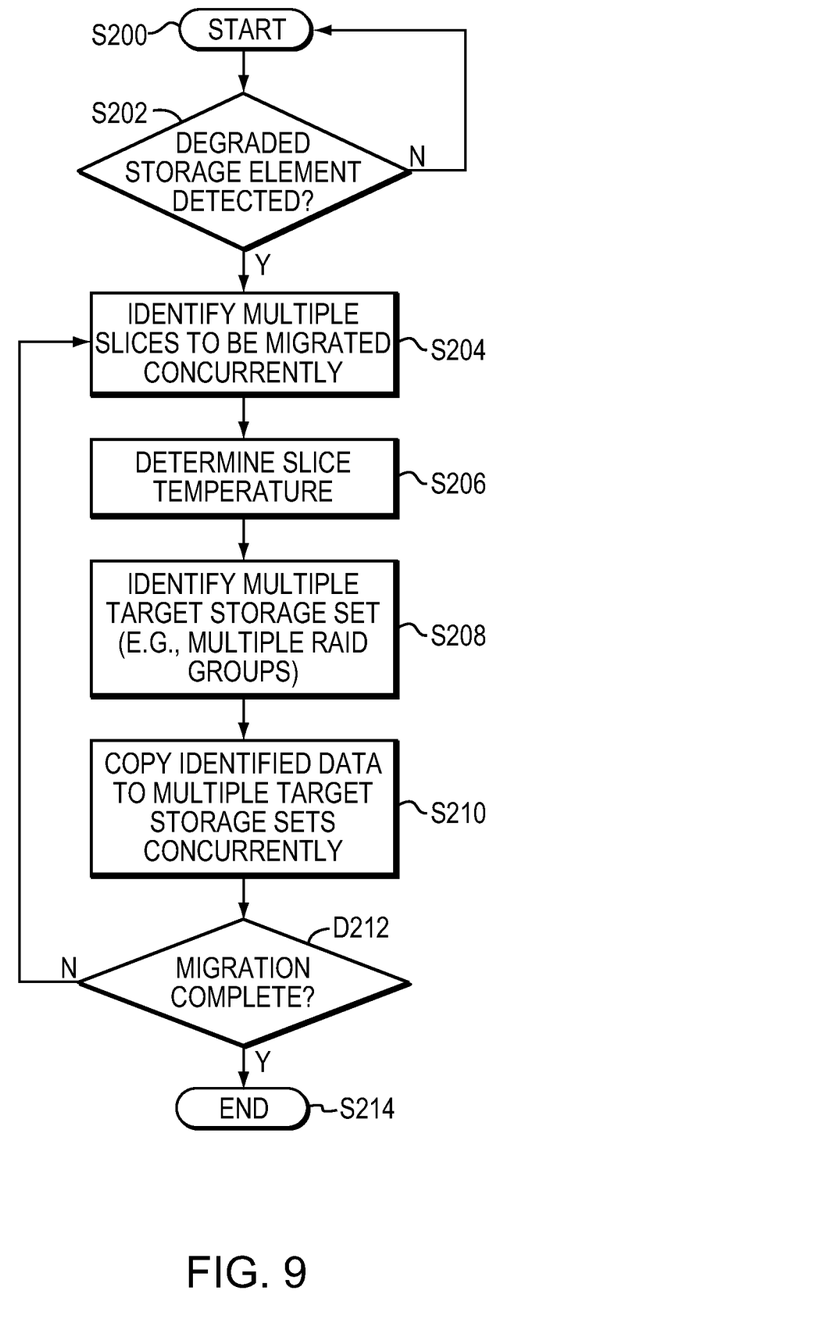

In an alternative example embodiment, the method shown in FIG. 8 may be modified in a way to enable parallel write operations similar to that shown in FIG. 7. In this example, the method begins with step S100, and may be initiated manually or automatically as described above. In step S102, RAID groups are monitored to identify storage elements that may be operating in a degraded performance mode.

Once a degraded storage element has been identified in step S102, multiple data slices are identified for migration in step S104. Operable storage elements in the RAID group associated with the degraded storage element are examined to identify data necessary to reconstruct the RAID's slice data. In step S106, the method may further include examining slice related meta data to determine slice temperature which may be used to prioritize slice order migration. Alternatively, other methods may be used to determine slice priority employing techniques describe herein.

In step S108, multiple target RAID groups are identified. A RAID group may be chosen as a target based on one or more factors including available space on other RAID groups, availability of unbounded storage elements, and RAID type (e.g., RAID-5, RAID-6, RAID-00, etc.). Alternatively, or in addition, a RAID group's tier level may also be considered. For example, hot or warm data that was previously stored on tier 2 storage comprising SATA hard disk drives may be promoted to tier 0 comprising EFD storage. Thus, in contrast with conventional methods, data abstraction and tiering techniques described herein enable the multiple target RAID groups to be of different types, configuration, or tier level. That is, the target RAID groups can be of different types, configurations, and/or tier levels than the source RAID group. Furthermore, individual RAID groups within the multiple target RAID groups can be of different types, configurations, and/or tier levels from each other.

In step S110, the identified prioritized slices may then be copied to the targeted multiple RAID groups concurrently. In this manner, write times to the target group may be reduced significantly. The priority order in which slices are copied may be based on temperature data ascertained in step S106, or other such factors as described herein. Migration completion is determined at step D112. If not, any of steps S104, S106, S018, S110 and D112 may be repeated until all necessary data slices have been concurrently copied to the multiple target RAID groups. Once the migration process completes, the method ends at step S114.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing degraded storage elements in data storage systems, the method comprising:
   identifying a storage element experiencing degradation, the storage element being a member of a first redundant array of independent disks (RAID) group including multiple storage elements, wherein the first RAID group includes at least three different storage tiers, a first tier having higher performance characteristics than a second tier and the second tier having higher performance characteristics than a third tier, wherein the first RAID group comprising the identified degraded storage element is designated as operating in a degraded mode;
   providing a spare storage element, the spare storage element arranged as a hot spare for the first RAID group, and initiating a rebuild procedure to rebuild data associated with the degraded storage element onto the spare storage element;
   identifying a first slice of data associated with the first RAID group comprising the degraded storage element and determining a temperature and storage tier of the first slice;
   based on the temperature and storage tier of the first slice, copying the first slice of data to a second RAID group of storage elements, wherein the second RAID group includes at least three different storage tiers, a first tier having higher performance characteristics than a second tier and the second tier having higher performance characteristics than a third tier, wherein copying includes copying the first slice of data residing on a first tier to a storage tier having second tier, wherein the second tier has higher performance characteristics than the first tier; and
   prior to completing the rebuild process, designating the first RAID group comprising the identified degraded storage element as operating in a non-degraded mode.

2. The method of claim 1, wherein identifying a slice of data further includes determining a temperature of the slice of data.

3. The method of claim 2, wherein copying the slice of data further includes prioritizing copying the slice of data based on the temperature of the slice.

4. The method of claim 3, wherein a data storage system comprises the storage element, the data storage system has first and second performance tiers, and the first performance tier comprises the first RAID group.

5. The method of claim 4, wherein the second performance tier comprises the second RAID group, the second performance tier being a higher performance tier than the first performance tier.

6. The method of claim 1, wherein the second RAID group is a type selected from a plurality of RAID groups having at least two different write characteristic types, wherein the second RAID group is a type capable of being written to faster than first RAID group.

7. The method of claim 1, further comprising:
identifying a second slice of data associated with the storage element; and
copying the second slice of data to a third RAID group of storage elements concurrently with the first slice of data.

8. The method of claim 7, wherein a data storage system comprises the storage element, wherein the data storage system comprises a first, second and third performance tiers, and the first performance tier comprises the first RAID group.

9. The method of claim 8, wherein the second performance and third performance tiers are of equal or higher performance than the first performance tier.

10. The method of claim 7, wherein the second and third RAID groups are of a type selected from a plurality of RAID groups having at least two different write characteristic types, wherein the second or third RAID group is a type capable of being written to faster than the first RAID group.

11. An apparatus for use in managing degraded storage elements in data storage systems, the apparatus comprising a processor and memory configured to:
identify a storage element experiencing degradation, the storage element being a member of a first redundant array of independent disks (RAID) group including multiple storage elements, wherein the first RAID group includes at least three different storage tiers, a first tier having higher performance characteristics than a second tier and the second tier having higher performance characteristics than a third tier, wherein the first RAID group comprising the identified degraded storage element is designated as operating in a degraded mode;
provide a spare storage element, the spare storage element arranged as a hot spare for the first RAID group, and initiate a rebuild procedure to rebuild data associated with the degraded storage element onto the spare storage element;
identify a first slice of data associated with the first RAID group comprising the degraded storage element and determining a temperature and storage tier of the first slice;
based on the temperature and storage tier of the first slice, copy the first slice of data to a second RAID group of storage elements, wherein the second RAID group includes at least three different storage tiers, a first tier having higher performance characteristics than a second tier and the second tier having higher performance characteristics than a third tier, wherein copying includes copying the first slice of data residing on a first tier to a storage tier having second tier, wherein the second tier has higher performance characteristics than the first tier; and
prior to completing the rebuild process, designating the first RAID group comprising the identified degraded storage ent as operating in a non-degraded mode.

12. The apparatus of claim 11, wherein identify a slice of data further includes determining a temperature of the slice of data.

13. The apparatus of claim 12, wherein copy the slice of data further includes prioritizing copying the slice of data based on the temperature of the slice.

14. The apparatus of claim 13, wherein a data storage system comprises the storage element, the data storage system has first and second performance tiers, and the first performance tier comprises the first RAID group.

15. The apparatus of claim 14, wherein the second performance tier comprises the second RAID group, the second performance tier being a higher performance tier than the first performance tier.

16. The apparatus of claim 11, wherein the second RAID group is a type selected from a plurality of RAID groups having at least two different write characteristic types, wherein the second RAID group is a type capable of being written to faster than first RAID group.

17. The apparatus of claim 11, wherein the processor is configured to identify a second slice of data associated with the storage element and to copy the second slice of data to a third RAID group of storage elements concurrently with the first slice of data.

18. The apparatus of claim 17, wherein a data storage system comprises the storage element, wherein the data storage system comprises a first, second and third performance tiers, and the first performance tier comprises the first RAID group.

19. The apparatus of claim 18, wherein the second performance and third performance tiers are of equal or higher performance than the first performance tier.

20. The apparatus of claim 17, wherein the second and third RAID groups are of a type selected from a plurality of RAID groups having at least two different write characteristic types, wherein the second or third RAID group is a type capable of being written to faster than the first RAID group.

* * * * *